Patented Apr. 25, 1950

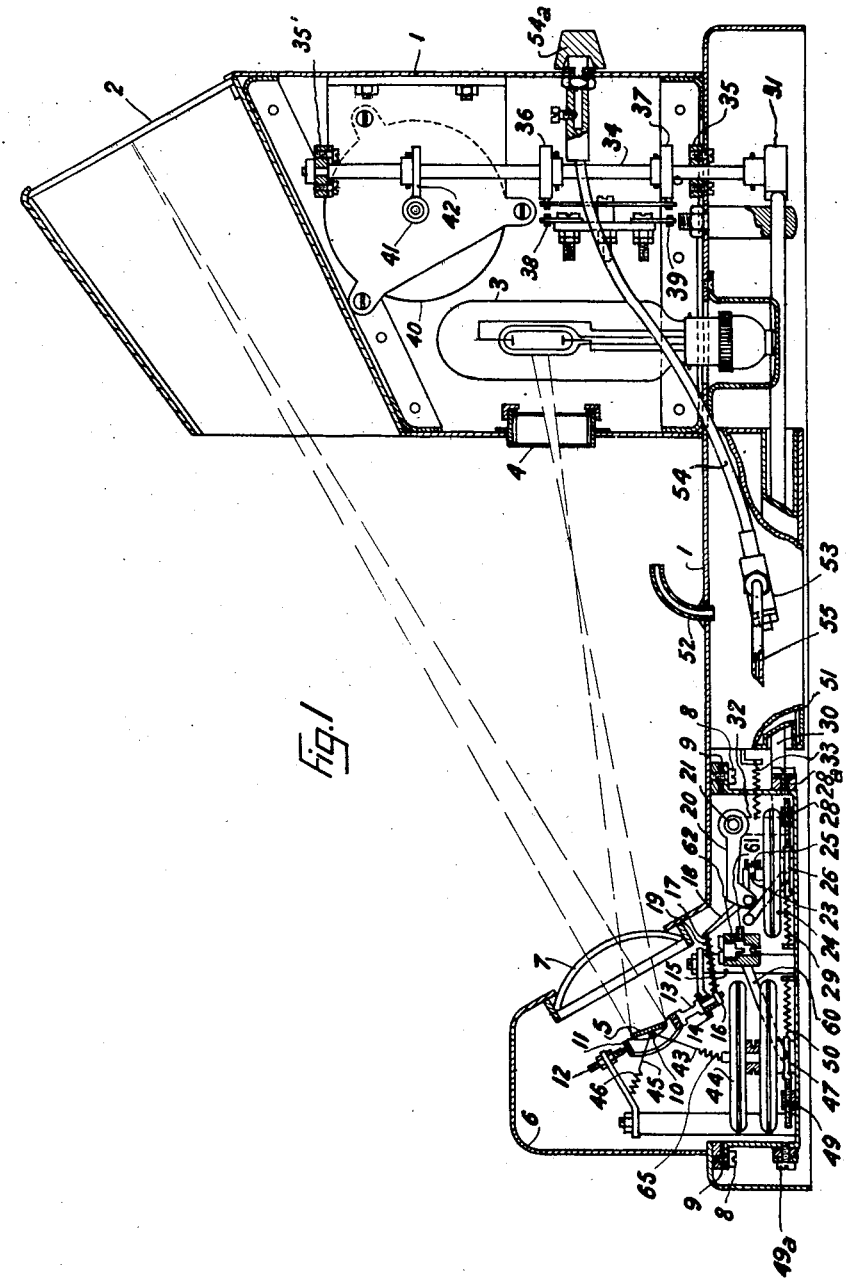

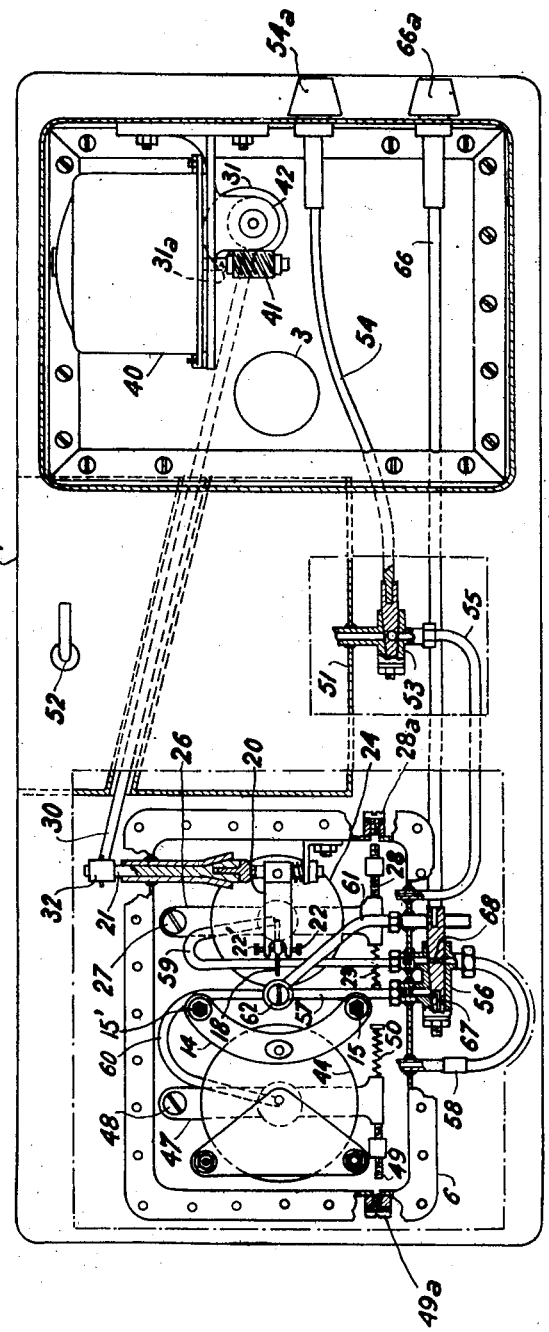

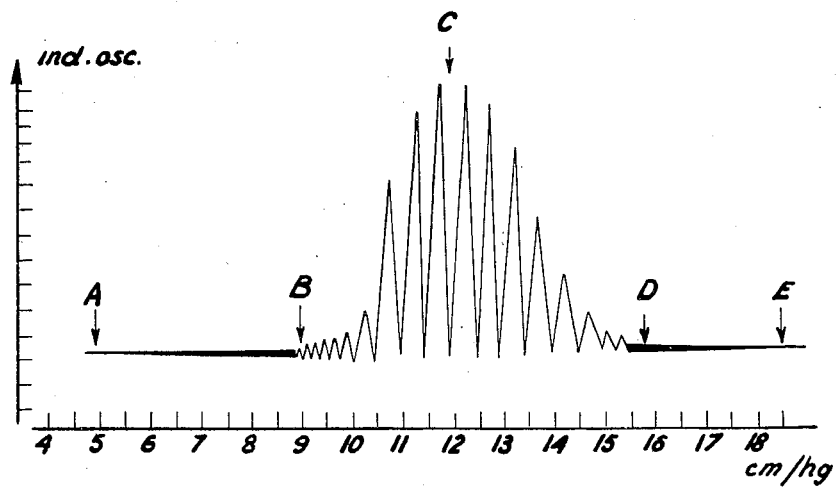
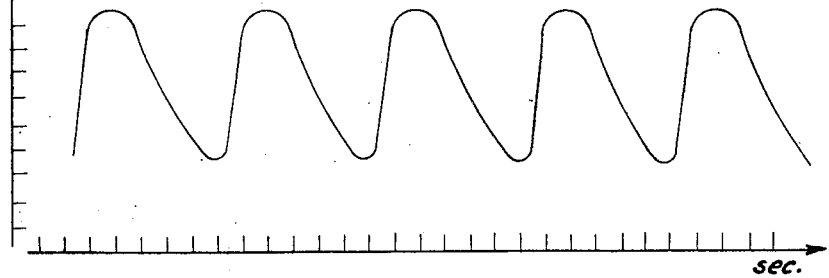

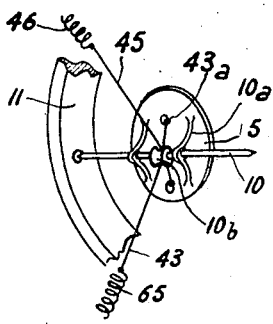
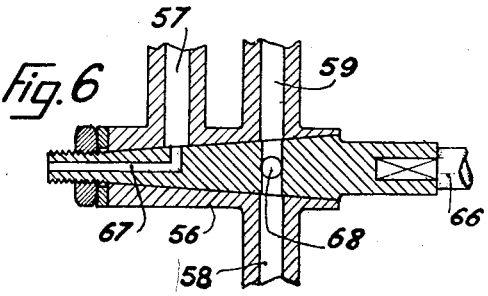
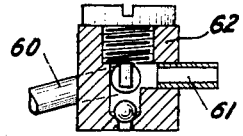

2,505,436

UNITED STATES PATENT OFFICE 2,505,436

APPARATUS FOR MEASURING AND RECORDING OSCILLATING PRESSURES, PARTICULARLY BLOOD PRESSURE

Frédéric André Etienne Serrell, Boulogne-sur-Seine, France

Application September 24, 1946, Serial No. 698,928
In France October 9, 1945

3 Claims. (Cl. 128—2.05)

My invention relates to an improved apparatus providing detection and survey of oscillating pressures which may occur in elastic pipes to the inner space of which access cannot be had particularly for the study of blood pressures.

The object of my invention is to provide measurement of minima, medium and maxima values of pressure and to obtain a record of the variations of said pressure. Numerous known apparatus devised for a like purpose are constructed and operated as follows: A limb is grasped by an armlet including one or several inflatable pouches: at first the armlet is inflated up to a pressure which is higher than maximum blood pressure and circulation is completely stopped by this compression of blood vessels. Then a progressive deflation of pouches is effected; manometers connected with the pouches detect the pressure variations in said pouches, and maxima, medium and minima blood pressures can be noted during restoration of blood circulation.

Such a procedure is objectionable from a physiological standpoint because the pressure levels thus read are inaccurate; as while the armlet is pre-inflated venous circulation is quickly checked and a reduction of blood flow follows which partly balances pressures in arteries.

Thus, measured pressures are not the real pressures in normal state. Furthermore, as a leak is necessary in at least one of the pouches of these devices, it is obvious that all measurements taken are incorrect.

According to my invention, provision is made whereby measurements are effected while air pressure rises in inflatable containers. Minimum physiological disturbance and greater accuracy are therefore ensured.

A blood pressure measurement apparatus usually comprises two pressure gauges, one of them indicating a standard or reference pressure, while the other shows momentary variations above or below said standard or reference pressure, then operating as a differential pressure gauge. In my apparatus, the device provided to measure standard or reference pressure is in connection with a case which is progressively inflated; a deformable enclosure is connected to this case through a check valve providing a one way passage for air from the case to the enclosure while preventing any air transfer from the enclosure to the case.

The differential manometric device measures the difference of pressures occurring between inside of case and inside of deformable enclosure, or practically momentary excess pressure in the deformable enclosure over that in the case.

It will therefore be well understood that in my apparatus a single deformable enclosure is needed. My deformable enclosure can as well be a conventional armlet, or for instance a capsule having a resilient exposed wall which can be placed and held by hand on the patient's skin where an artery is just below, for example the temporal or the radial artery.

In known devices, readings must be made simultaneously on two manometric dials and the eye has to follow the movements of two needles which is quite difficult.

Devices have been made to record separately and simultaneously indications from the two gauges, to be compared afterwards.

In my apparatus, pressure variations from the two manometers are transmitted to a spot mirror arranged to swing about two axes at right angles, each manometric influence acting respectively upon one of the axes.

By a well known optical process the mirror produces a luminous curve on a screen, as a result of simultaneous influences of both manometric variations, the coordinate axes of which are parallel with the axes of the mirror.

For instance abscissae represent the reference pressures and ordinates the pressure oscillations above or below reference pressures thus giving an oscillomanogram. The levels of minimum, means or average and maximum pressures are given by measurement of coordinates at characteristic points.

It is also provided in my invention to replace the control of the mirror in response to rising mean pressure by a control securing a uniform rotation for said mirror, for instance a clockwork. In this case the luminous curve on the screen will be a record of pressure variations as a function of time, called sphygmogram.

The following description with reference to the appended drawings given solely by way of examples will show how this invention may be carried out.

Similar numerals refer to similar parts throughout the several views.

Fig. 1 is a section through a typical embodiment of a combined apparatus with which two different sorts of diagrams are recorded.

Fig. 2 is a plan view of the same, with parts in section and parts broken away.

Fig. 3 is an oscillomanogram as recorded by the apparatus; pressures are in abscissae and oscillometric indications in ordinates.

Fig. 4 is a sphygmogram recorded by the apparatus, with times in abscissae and the ordinates in proportion to oscillometric indications.

Fig. 5 is a perspective detail of the mirror assembly.

Figs. 6 and 7 are sections on an enlarged scale of a stop-cock and a valve.

The frame-work 1 of the apparatus carries a screen 2. This is a glass plate having its inside face covered with a material which remains phosphorescent for a certain time when exposed to short luminous waves. Readings are made on the outside face by transparency.

Under the screen in a dark box at the forepart of the frame-work is a mercury vapour lamp 3. Through a double diaphragm 4, light is thrown solely on the spot mirror.

This spot mirror 5, in turn, throws a spot light on the screen 2.

An air-tight box 6 at the rear of apparatus has a transparent curved surface 7. Box 6 is secured on frame-work by screws 8 and air-tight butt-joint 9.

Mirror 5 is held on horizontal shaft 10 by lugs 10a (Fig. 5). It oscillates around this shaft in a round frame 11, which in turn is supported by a shaft 13 and held by a point ended screw 12. Shaft 13 revolves with frame 11 on a support 14, fastened within box 6 by two small posts 15 and 15'.

The lower end of shaft 13 is fast with a short lever 16 shown perpendicularly to the plane of Fig. 1.

This lever is connected to a crank lever 18 through a tension spring 19 and a rod 17 which is pointed at both ends and lies in abutting relationship with levers 16 and 18, providing a spacer therebetween.

A crank lever 20 which revolves with shaft 21 carries lever 18 through pivots 22 and 22'. The lower branch of lever 18 rests in sensitive contact with the centre of a manometric capsule 24 through knife-shaped support 23 and spring 25.

Capsule 24 is fastened on plate 26. Proper adjustment in vertical and horizontal position of fixture of this plate 26 with respect to the bottom of box 6 is ensured by screws 27 and 28, (the latter accessible from outside by unscrewing and taking off a screw-threaded plug 28a) and spring 29. Adjustment of screw 28 modifies leverage of knife 23 on lever 18 and therefore controls the amplitude of motion of the spot mirror as a function of the deformations of capsule 24.

Thrust rod 30 bears on spiral cam 31 at one end and on crank lever 32 fastened on shaft 21 at the other end, and proper contact of moving parts is ensured by spring 33.

Movement of lever 18 and consequently movement of frame 11 and mirror around axis 12—13 can therefore be the result either of a movement of thrust rod 30, knife 23 providing a fulcrum, or of variations in size of capsule 24, in which case the fulcrum is provided by pivots 22. Shaft 34 supported in bearings 35 and 35' carries besides cam 31 two other cams 36 and 37 actuating electrical contacts 38 and 39.

This shaft 34 is revolved by synchronous-motor 40 at a reduced speed of about one revolution in ten seconds, through a worm 41 and a worm wheel 42.

In the invention as thus far described, it is readily seen that movements of the spot mirror about the axes of pivots 12, 13 are subjugated with precise and fine sensitiveness on the one hand to deformation of capsule 24 and on the other hand to rotation of motor 40.

In addition to this, further movements of the spot mirror about the axis of pin 10 depend on deformations of capsules 44 in the following manner:

A very supple thread 43 is fastened at one end to the upper back part of the mirror at 43a (Fig. 5) and at the other end to the centre of capsule 44. Said thread passes between shaft 10 and back of mirror 5, preferably in a groove 10b on shaft 10 and in line with point 12 and pivot 13 of frame 11.

Another supple thread 45 is fastened at one end to the lower back part of mirror 5 and passes in same groove as thread 43. The other end is attached to an end of a spring 46 the other end of which is attached to the lug in which screw 12 is supported, as shown; the function of spring 46 which through thread 45 tends to rotate mirror 5 counterclockwise (Fig. 1) is to maintain threads 43, 45 permanently in stretched condition. It is further desirable to connect thread 43 to capsule 44 through a rather stiff spring 65 as this avoids breaking of threads that might be due to great deformations of capsules 44, whether normal or accidental. Capsules 44 are fastened to plate 47 which, same as part 26 is connected to the bottom of box 6, by screw 48. Suitable position of mirror is also controlled by screw 49 (accessible from outside after unscrewing and taking off a screw-threaded plug 49a) and spring 50.

Air tight box 6 containing the capsules can be connected to a compressed air tank 51 filled through ingress pipe 52. The stop cock 53, remote controlled by flexible rod 54 and knob 54a, sends compressed air in said box through pipe 55. On the box a three way distributor 56 also remote controlled by flexible rod 66 and knob 66a provides for the following communications:

(a) In first or discharge position air from outside at atmospheric pressure communicates through canal 67 with inside of capsule 44 by channels 57 and 60 and through valve 62 described further. In addition the T-shaped passage 68 in the distributor plug sets in communication with outside air the inside of box 6 by channel 58, and also the inside of capsule 24 by channel 59 (the branch of T-passage, at right angles with plane of Fig. 6 corresponds with an opening to the outside in downward direction). In this position of distributor 56 shown in Figs. 2 and 6 all parts and enclosures of the apparatus are brought to atmospheric pressure.

(b) For the purpose of recording an oscillo-manogram as will be explained further, distributor 56 is turned ¼ or 90 degrees on the left. Communications of outside air with capsule 44 and box 6 are sealed. The sole remaining passage for outside air is to inside of capsule 24 through T-hole 68 and a pipe 59.

(c) To record a sphygmogram, an additional quarter turn of distributor 56 is effected on the left. In this position, inside of capsule 24 is connected directly to box 6 by channels 58 and 59 and by the part of T-hole traversing through and through the distributor. All other communications are sealed.

Tube 60 is extended through valve 62 by channel 61 which is connected to a single pouch belted armlet of the known type. Or, owing to the fine sensitiveness of my apparatus, the armlet outfit can be advantageously replaced by a simple capsule held by hand on certain arteries giving outside perceptible pulsations such as the temporal or the radial artery.

In all cases armlets (or hand capsules) are in permanent connection with inside of capsule 44. The check valve 62 (Fig. 7) gives a one way passage from box 6 to capsule 44. Surplus pressure in box 6 enters capsule 44 and armlets (or hand capsules), but the reverse does not occur.

Now the operation of this apparatus is as follows:

In order to record an oscillomanogram the distributor 56 being in proper position b, mirror being suitably adjusted by screws 28 and 49, switching on the light gives a bright spot on left side of the screen. Armlet is suitably fitted while stop-cock 53 is closed.

Air is pumped in tank 51 with e. g. a rubber bulb pump fitted on pipe 52. Pressure is brought up to about 40 centimeters of mercury above atmospheric pressure.

In opening stop-cock 53, air pressure rises automatically and regularly in air tight box 6 and passing through the discharge valve 62 and capsule 44 rises to the same extent in armlet pouch.

Inside of capsule 24 remains at atmospheric pressure through T-hole 68 of distributor 56. Rise of pressure in air-tight box 6 gradually flattens down capsule 24 in proportion to the difference of pressures. The downward movement of the center of capsule 24 results in a rotation of frame 11 and consequently of mirror 5 about the axis of members 12, 13, motion being transmitted through support 23, lever 18, rod 17 and lever 16.

The light spot thus moves on the screen in parallel relationship with the axis of abscissae, in proportion to rise of pressure in box 6. As pressure rises, arteries and muscles are gradually compressed, the light spot moving from A to B (Fig. 3).

When the pressure which prevails in air-tight box 6 and is equal to that in the cuff pouch owing to valve 62, begins to exceed the minimum blood pressure of the patient (diastolic pressure), the arteries are slightly collapsed during the diastolic period, in such a manner that each heart contraction slightly increases arterial beating amplitude with respect to normal state.

Variations in arterial volumes are therefore proportionately transmitted through the armlet and pipes 61, 60 to capsule 44 in the form of pressure oscillations whatever the frequency of heart beatings may be, as the valve 62 is automatically closed at the very beginning of each pressure oscillation. Capsule 44 is thus sensitive to all variations in the pouch pressure above reference pressure prevailing in box 6.

Every oscillation in pressure is translated as a deformation of capsule 44 which causes the mirror 5 to rotate on shaft 10 through thread 43 and spring 46. Variations in magnitude of arterial beatings under the armlet thus result in oscillations of the light spot as illustrated by the curve portion BC on Fig. 3, B showing the minimum or diastolic pressure.

As air pressure rises in the armlet, the amplitude of oscillation of the capsule 44 increases and reaches a maximum level (point C on the curve) when the air pressure has reached the mean level of blood pressure. A further rise of pressure in armlet pouch gradually stops all blood circulation by causing blood vessels to be collapsed. Spot oscillations decrease and finally disappear, as there are no more differential manometric variations in capsule 44, (as shown by the curve position DE on Fig. 3).

At point D, the air pressure in the cuff balances the maximum or systolic blood pressure. It being borne in mind that abscissae are proportional to blood pressure it will be realized that the abscissae of B, C, D correspond to the diastolic, means and systolic pressures respectively.

For obtaining a sphygmogram record, the electric bulb is switched on to cause the light spot to appear on the left side of the screen, the stopcock 53 is closed and distributor 56 placed in position previously specified under c.

In this position, the inside of capsule 24 is in communication with air-tight box 6 through channels 58 and 59. Therefore capsule 24 is no longer subjected to deformation due to pressure variations, as inside and outside pressures on said capsule are equal. Then, switching on motor 40 revolves cam 31, frame 11 and spot mirror 5 around axis 12—13 as explained in proportion to time.

Uniform rotation of mirror displaces the spot in abscissae on the screen, from left to right. When cam 31 has almost completed its revolution, the thrust rod 30 rides over a portion 31a of the cam having a smaller radius, when the spring 33 restores all the levers to initial position.

In opening stop-cock 53, compressed air from tank 51, enters air-tight box 6, armlet and capsule 14 through discharge valve 62.

As soon as air pressure rises slightly above the minima pressure of the subject stop-cock 53 is closed. (It has been said with reference to Fig. 3 that this occurs when spot oscillations in ordinates suddenly increase in magnitude).

Controls of mirror oscillations on shaft 10 subjected to arterial tension oscillations remain as they were conditioned for oscillomanogram recording.

In view of the pressure levels in the apparatus enclosures during registration, the displacements of spot in ordinates are in strict correspondence with oscillations of arterial tension. In these conditions, if motor 40 is started, displacement of spot will also take place in abscissae, describing on the screen the sphygmogram shown Fig. 4.

Registration takes place through a single revolution of cams 31, 36 and 37 (cams 36, 37 controlling contacts 38 and 39). As the mirror is brought back by cam 31 to initial position, light 3 is switched off by cam 36 and contact 38, so there is no spot light allowed to travel on the screen during return course. This switching off can also be replaced by a masking operation, in case switching off and subsequent reheating of the vapour lamp should require too much time.

After one revolution, cam 37 and contact 39 cut off motor 40, which is always stopped in the same position.

In addition to contact 30 and cam 37 a push button is provided on same wiring to start the motor 40.

In recording oscillomanograms, lighting of the lamp can readily be actuated by a different switch possibly controlled from knob 6a, closing lamp circuit when the knob is in position b and c.

While I have described in the foregoing, one embodiment of my invention, I wish it understood that certain departures or various changes may be resorted to, without departing from the spirit and scope of the invention, so long as the structure falls within the terms of the appended claims.

What I claim is:

1. In an apparatus of the type described to be used in association with a source of fluctuating air pressure, the combination of a frame; a mirror; means providing a Cardan suspension for said mirror in said frame, with allowance for rotation of said mirror about a first axis stationary with respect to said frame, and about a second axis at right angles to the first axis; means responsive to pressure difference between the pressure from said source and a reference pressure, for moving said mirror about one of said axes; and means responsive to the pressure difference between said reference pressure and atmospheric pressure for moving said mirror about the other axis.

2. In an apparatus of the type described, the combination of a frame; a mirror-carrier pivotally mounted in said frame for rotation about a stationary axis; a first pressure gauge including a member movable in response to pressure; means operatively interposed between said movable member and said mirror-carrier, for rotating said mirror-carrier; a mirror rotatably supported in said mirror carrier for rotation about an axis at right angles to said stationary axis; a second pressure gauge including a member movable in response to pressure; means providing a flexible connection between said mirror and said movable member of the second pressure gauge, arranged to pass through a point on the first axis, for causing rotation of said mirror about the second axis in response to movement of said second movable member in one direction; and means including a flexible connection between said mirror and said frame, also arranged to pass through said point, for resiliently biassing said mirror to rotation in the direction opposite to that of the rotation caused by the second movable member when the latter moves in the first-named direction.

3. In an apparatus of the type described, the combination of a frame, a mirror-carrier pivotally mounted in said frame for rotation about a stationary axis, a manometric device including an exposed member movable in response to pressure variations in said device, a two-arm rocking lever adapted and arranged to have one arm thereof functionally coupled with said exposed member to move therewith and to be moved thereby, means for coupling the other arm of said lever with said mirror-carrier, so that the rotation of said mirror-carrier is controlled from said lever, a second two-arm rocking lever pivotally supported in said frame, means on one arm of said second lever, providing a pivot and a support for said first lever, and means operatively engaging the other arm of said second lever for rocking said second lever.

FRÉDÉRIC ANDRÉ ETIENNE SERRELL.

REFERENCES CITED

The following references are of record in the file of this patent:

UNITED STATES PATENTS

| Number | Name | Date |
|---|---|---|
| 1,903,890 | Blum | Apr. 18, 1933 |
| 2,371,244 | Lax | Mar. 13, 1945 |

FOREIGN PATENTS

| Number | Country | Date |
|---|---|---|
| 322,530 | Great Britain | Dec. 29, 1929 |
| 719,415 | France | Nov. 14, 1931 |
| 756,704 | France | Sept. 25, 1933 |
| 776,604 | France | Nov. 8, 1934 |